Figure 1:
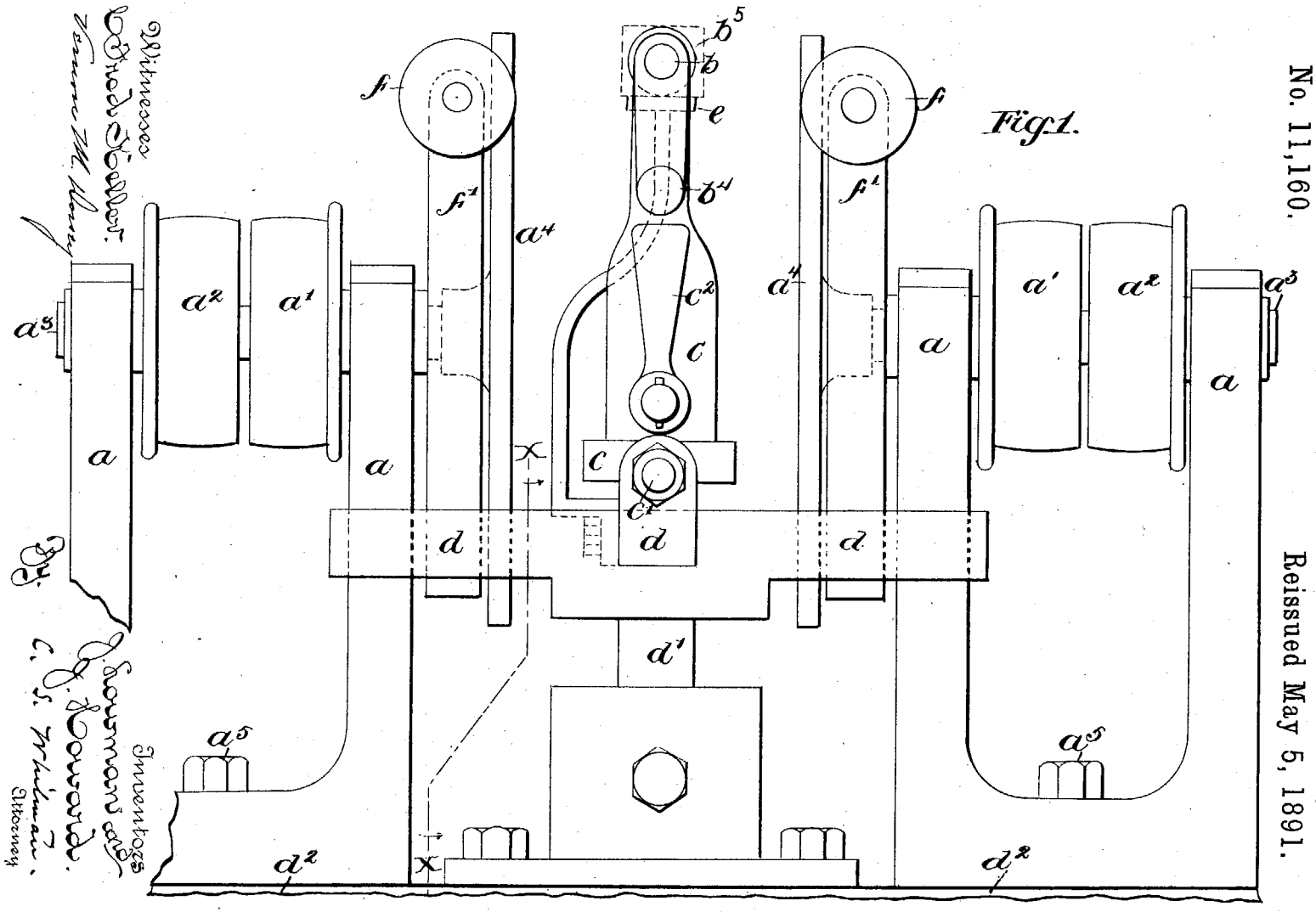

3 Sheets—Sheet 1.

J. LOWMAN & J. HOWARD.

Assignors to FISHER, HOWARD & SONS.

MACHINE FOR THE MANUFACTURE OF CORKS BY GRINDING.

No. 11,160. Reissued May 5, 1891.

THE NORRIS PETERS CO., PHOTO-LITHO., WASHINGTON, D. C.

3 Sheets—Sheet 2.

J. LOWMAN & J. HOWARD.

Assignors to FISHER, HOWARD & SONS.

MACHINE FOR THE MANUFACTURE OF CORKS BY GRINDING.

No. 11,160. Reissued May 5, 1891.

Witnesses
Fred. Kelley.
Vernon M. Kinney.

Inventors
J. Lowman and
J. Howard.
By C. S. Whilman
Attorney

THE NORRIS PETERS CO., PHOTO-LITHO., WASHINGTON, D. C.

3 Sheets—Sheet 3.

J. LOWMAN & J. HOWARD.

Assignors to FISHER, HOWARD & SONS.

MACHINE FOR THE MANUFACTURE OF CORKS BY GRINDING.

No. 11,160. Reissued May 5, 1891.

Witnesses
C. F. Hallett
J. M. Maney

Inventors
J. Lowman and
J. Howard.
By C. S. Whitman
Attorney

THE NORRIS PETERS CO., PHOTO-LITHO., WASHINGTON, D. C.

UNITED STATES PATENT OFFICE.

JOHN LOWMAN AND JOHN HOWARD, OF LONDON, ENGLAND, ASSIGNORS TO FISHER, HOWARD & SONS, OF SAME PLACE.

MACHINE FOR THE MANUFACTURE OF CORKS BY GRINDING.

SPECIFICATION forming part of Reissued Letters Patent No. 11,160, dated May 5, 1891.

Original No. 372,629, dated November 1, 1887. Application for reissue filed October 24, 1888. Serial No. 289,063. Patented in France January 24, 1887, No. 181,094; in England January 26, 1887, No. 1,240; in Germany January 30, 1887, No. 40,657; in Russia March 23, 1887; in Spain March 24, 1887, No. 6,670; in Belgium June 27, 1887, No. 77,968; in Norway June 29, 1887, No. 594; in Sweden June 30, 1887, No. 1,167; in Canada August 24, 1887, No. 27,503; in Italy September 30, 1887, No. 21,952/300; in Denmark November 10, 1887, No. 8,757; in Portugal December 1, 1887, No. 1,197; in Switzerland February 21, 1888, No. 308; in Austria-Hungary April 4, 1888, No. 3,063 and No. 11,476, and in Finland May 16, 1888, No. 306.

DIVISION A.

*To all whom it may concern:*

Be it known that we, JOHN LOWMAN, engineer, of 188 Albany Road, Camberwell, London, in the county of Surrey, England, and JOHN HOWARD, of the firm of FISHER, HOWARD & SONS, cork merchants, of 73 Minories, in the city of London, England, subjects of the Queen of Great Britain, have invented certain new and useful Machines for the Manufacture of Corks by Grinding, of which the following is a specification, and which have been patented in the following countries: France, No. 181,094, dated January 24, 1887; Great Britain, No. 1,240, January 26, 1887; Germany, No. 40,657, January 30, 1887; Spain, No. 6,670, March 24, 1887; Belgium, No. 77,968, June 27, 1887; Norway, No. 594, June 29, 1887; Sweden, No. 1,167, June 30, 1887; Canada, No. 27,503, August 24, 1887; Italy, No. 21,952/300, September 30, 1887; Denmark, No. 8,757, November 10, 1887; Portugal, No. 1,197, December 1, 1887; Switzerland, No. 308, February 21, 1888; Austria-Hungary, Nos. 3,063/11,476, April 4, 1888, and Finland, No. 306, May 16, 1888, and for which we have made an application for Letters Patent in Russia, dated March 23, 1887.

This invention relates to improvements in machinery for manufacturing corks from pieces of cork technically known as "squares" or "quarters."

Reference is had to the accompanying drawings, wherein the same parts are indicated by the same letters.

Figure 2:
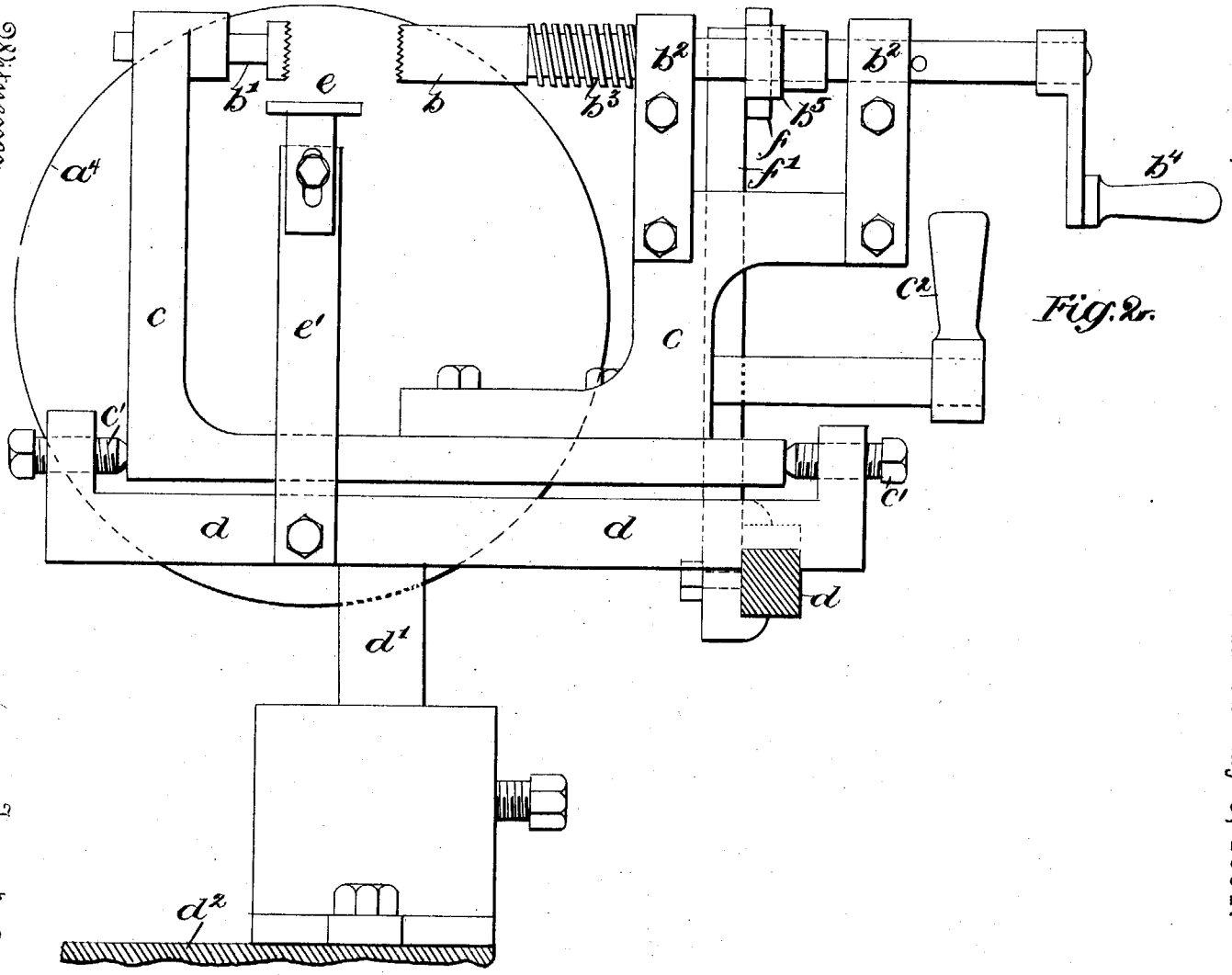
Figure 3:
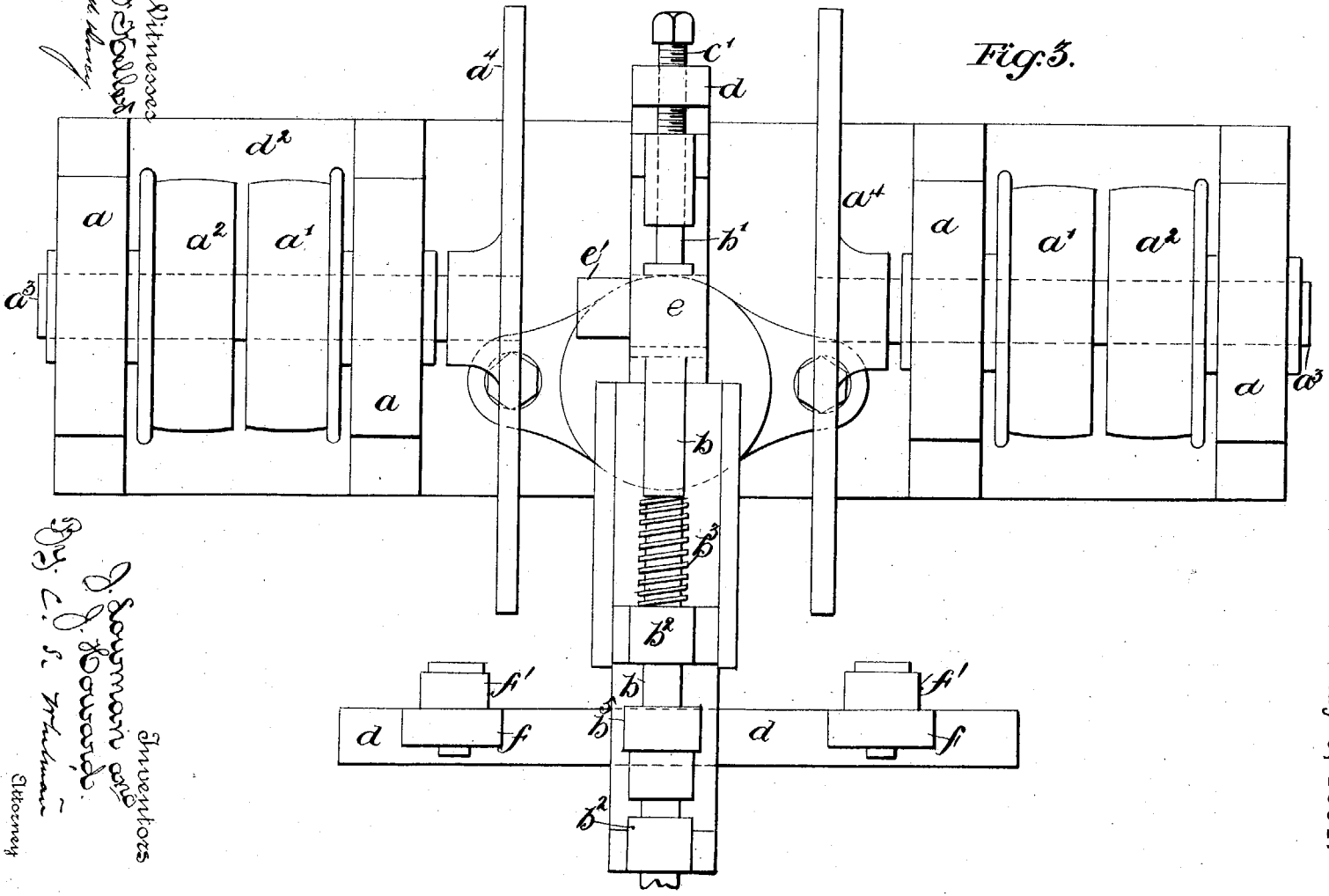

Figure 1 shows a front elevation; Fig. 2, a transverse section on the line $x\ x$ of Fig. 1, and Fig. 3 a plan of a machine for manufacturing corks in accordance with our invention.

$a\ a$ are two head-stocks pivotally secured to a base $d^2$ by bolts $a^5$, and on which fast and loose pulleys $a'\ a^2$ are mounted upon axes $a^3$ $a^3$, on the inner ends of which the revolving disks $a^4\ a^4$ are fixed, faced with sand, glass, or emery-paper or other suitable grinding-surface.

$b\ b'$ are holding-instruments, between the ends of which the square of cork is held while the corners are ground off. The holder $b$ consists of a spindle capable of sliding and revolving in bearings $b^2\ b^2$, carried by and bolted to the frame $c$, which moves upon centers $c'\ c'$ on the bar $d$, mounted upon the adjustable support $d'$ and fixed bed $d^2$. The spring $b^3$ acts to force out the holder $b$ (when the spindle is drawn back,) so as to close upon the end of the square or block of cork laid by hand upon the adjustable table $e$ on the support $e'$, bolted to the bar $d$, to take and hold the cork firmly against the end of the rotating holder $b'$. The spindle and holder $b$ receive rotary motion by means of the crank-handle $b^4$; and $c^2$ is a handle by which the frame $c$ can be moved to and fro to cause it to oscillate upon the centers $c'\ c'$, so as to place the revolving cork against the face of either of the disks $a^4\ a^4$, as required.

$b^5$ is a cam or shaped eccentric mounted upon the spindle $b$. This cam, which corresponds in contour with the cross-section of the cork when ground, revolves in contact with one of the friction-rollers $f$, carried by the fixed standards $f'$ on the bar $d$.

The operation of our device is as follows: When it is desired to turn out plain cylindrical corks, the square is clamped between the holders $b$ and $b'$, as will be obvious, and the frame $c$ inclined by means of handle $c^2$ until the square comes in contact with the rapidly-rotating disk. The square is then turned by handle $b^4$, first slowly to present its corners one by one to the disk, and then rapidly, in order to finish it and add a smooth exterior surface. When corks of the shape of a truncated cone are to be formed, the bolts $a^5$ are loosened and frames $a\ a$ turned on said bolts, so that the disks will stand at the desired angle to each other, after which said bolts are tightened and the corks ground as above. When corks having an oblong or other shaped section are to be turned, the cam $b^5$ is replaced by one (not shown) having the desired section, and the operation carried out as described. In each case when the square has been ground down to the size desired the cam or eccentric $b^5$ will strike one of the rollers $f$ and prevent further grinding, after which one slow revolution of the ground square will remove all projections and leave it a finished cork.

We claim as new—

1. In a machine for the manufacture of corks by grinding, the combination, with a plane-grinder, of an oscillating frame, holders for the cork mounted in the said frame opposite to each other and at right angles to the plane of motion thereof, and a hand attachment for rotating the said holders, as and for the purposes described.

2. In a machine for the manufacture of corks by grinding, the combination of two grinding-surfaces of different grades of fineness, a rotary cork-holder, and a frame which carries the rotary cork-holder and is movable to bring the cork into contact with either of the grinding-surfaces, substantially as described.

3. In a machine for the manufacture of corks by grinding, the combination, with the rotating disk $a^4$, of the rotary holder $b''$, the horizontal shaft $b$ in line with the axis of said holder, a chuck at one end of the said shaft for holding the cork against said holder and a handle at the other for turning the shaft, and a rocking frame in which said shaft and holder are journaled, substantially as described.

4. In a machine for grinding corks, the combination of two grinding-disks oppositely disposed and rotating in vertical planes, the grinding-surface of one disk being finer than that of the other, a rocking frame supported between the said disks, a holder journaled in said frame, a shaft also journaled in said frame opposite said holder, a chuck at one end of said shaft for clamping the cork against said holder, and a crank at the other end for turning the shaft, substantially as described.

5. In a machine for grinding corks, the combination, with the rotating disk $a^4$, of the base $d^2$, $d'$, and $d$, the support $e'$, secured to said part $d$, the adjustable table $e$, attached to said support, the rocking frame $c$, pivoted to said part $d$, and a clutch for said cork supported by said frame normally above said table $e$, substantially as described.

6. In a machine for grinding corks, the combination, with the rotating disk $a^4$ and friction-roller $f$, supported at one side thereof and having its periphery in the same plane with the face of said disk, of the rotary holder $b'$, the horizontal shaft $b$ in line with the axis of said holder, a chuck at one end of said shaft for holding the cork against said holder, and a crank at the other end for turning the shaft, a rocking frame $c$, in which said shaft and holder are journaled, and a templet $b^5$ on said shaft opposite said friction-roller $f$, said templet having the contour desired for the finished cork, substantially as described.

JOHN LOWMAN.
JOHN HOWARD.

Witnesses:
HERBERT E. DALE,
JNO. DEAN,
*Both of* 17 *Gracechurch Street, London, E. C.*